United States Patent [19]
Davenport

[11] Patent Number: 5,251,681
[45] Date of Patent: Oct. 12, 1993

[54] METHOD AND APPARATUS FOR OPTIMIZING PLANER MILL OUTPUT

[75] Inventor: David K. Davenport, Dover, N.C.

[73] Assignee: Newman-Whitney, Greensboro, N.C.

[21] Appl. No.: 894,449

[22] Filed: Jun. 5, 1992

[51] Int. Cl.⁵ .................. B27C 1/14; B27B 1/00; G06F 15/20

[52] U.S. Cl. .................. 144/356; 83/72; 83/74; 83/370; 144/3 R; 144/3 A; 144/114 R; 144/357; 318/561; 364/474.09; 364/474.15; 364/474.16

[58] Field of Search .............. 144/1 R, 3 R, 3 A, 3 B, 144/114 R, 356, 357, 2 R; 83/72, 74, 76, 365, 370; 364/468, 474.09, 474.15, 474.17, 474.11; 318/561, 571, 591

[56] References Cited

U.S. PATENT DOCUMENTS

| | | |
|---|---|---|
| 3,548,172 | 12/1970 | Centner et al. .................. 318/561 |
| 3,634,664 | 1/1972 | Valek .................. 318/561 |
| 3,665,493 | 5/1972 | Glowzewski et al. . |
| 3,873,816 | 3/1975 | Takeyama et al. . |
| 3,956,617 | 5/1976 | Schmidt . |
| 4,330,832 | 5/1982 | Kohzai et al. .................. 364/474.09 |
| 4,707,793 | 11/1987 | Anderson .................. 364/474.09 |
| 4,926,309 | 5/1990 | Wu et al. .................. 364/149 |
| 4,926,917 | 5/1990 | Kirbach .................. 144/356 |
| 5,043,862 | 8/1991 | Takahashi et al. .................. 364/162 |
| 5,201,258 | 4/1993 | Cremona .................. 144/357 |

*Primary Examiner*—W. Donald Bray
*Attorney, Agent, or Firm*—Bell, Seltzer, Park & Gibson

[57] ABSTRACT

A method and associated apparatus for selecting a target rate of board treatment by a woodworking tool, measuring the difference between the actual rate of board treatment by the woodworking tool and the selected target rate, calculating the tool speed required to reduce the difference between the target rate and the actual rate to zero, and then periodically adjusting the tool speed of the woodworking tool based on the calculated speed required to reduce the difference to zero.

20 Claims, 1 Drawing Sheet

METHOD AND APPARATUS FOR OPTIMIZING PLANER MILL OUTPUT

FIELD OF THE INVENTION

The present invention relates to woodworking production, and in particular relates to a method and apparatus for optimizing the output of a planer mill.

BACKGROUND OF THE INVENTION

A planer mill is a woodworking operation of the type used in large volume lumber manufacturing. A planer mill typically includes a number of individual machines grouped together in a production line setting. One of the key machines in a planer mill is a planer unit, or "planer-matcher", a device which planes wood to predetermined dimensions; i.e. smoothes or levels flat or uniformly contoured surfaces of wood using relatively wide edged blades. The planer-matcher often works in combination with other machines positioned in the production line, such as circular saws, band saws, or log gang saws and related machines, and to which the planer-matcher is connected by chain or belt conveyors.

Typically, a planer-matcher can operate at a faster speed than some of the other units in a woodworking or lumber mill. As a result, the planer can operate no faster than the speed of the slowest unit in the production line Stated differently, some other portion of the mill usually represents the rate determining step. If the planer were to operate at a speed faster than the speed of the slower conveyor unit for example, the planer would produce an overabundance of planed wood, resulting in a jam-up. Under such circumstances, which tend to occur in manually operated plants, an operator then must stop the production line and remove the jam. This can be costly in terms of production. For example, if such a line stops for ten minutes, and the planer operates at a feed rate of about 100 pieces of wood per minute, such a jam-up and the related down time would account for a productivity drop of 1,000 pieces of planed wood that otherwise could have been manufactured during that time period.

In general, planers are usually operator controlled. The operator observes the general rate at which wood pieces or boards are being fed into and out of the planer and then uses a potentiometer or similar control to either speed up or slow down the planer-matcher to obtain a desired rate. This technique offers a number of disadvantages, however, particularly the lack of precise control over the speed of the planer-matcher. As stated above, if wood is being treated by the planer-matcher at rates of up to 100 pieces per minute, an operator may experience difficulty in estimating and hand-controlling the speed of the planer-matcher in an attempt to maintain a speed that both prevents downstream jam-up of planed wood, while at the same time speedily working all of the wood being fed into it without causing input delays.

Therefore, the need exists for a more precise control of a planer-matcher in a manner which moderates the differences in speed that can occur during overall mill operations, while avoiding the inherent difficulties in trying to do so manually.

OBJECTION AND SUMMARY OF THE INVENTION

It is the object of the present invention to provide a method of optimizing the method of output production of a woodworking tool such as a planer-matcher. The invention meets this object with a method of optimizing the output production of a particular tool in a production line of the type in which in which individual boards are sequentially handled by different tools that typically operate at different speeds. The invention comprises selecting a target rate of board treatment by the woodworking tool, measuring the difference between the actual rate of board treatment by the woodworking tool and the selected target rate, calculating the tool speed required to reduce the difference between the target rate and the actual rate to zero, and then periodically adjusting the tool speed of the woodworking tool based on the calculated speed required to reduce the difference to zero.

In another embodiment the invention comprises the apparatus for optimizing the output production of a woodworking tool such as a planer-matcher in a production line of the type just described.

The foregoing and other objects, advantages and features of the invention, and the manner in which the same are accomplished, will become more readily apparent upon consideration of the following detailed description of the invention taken in conjunction with the accompanying drawings, which illustrate preferred and exemplary embodiments and wherein:

DETAILED DESCRIPTION

Figure 1:
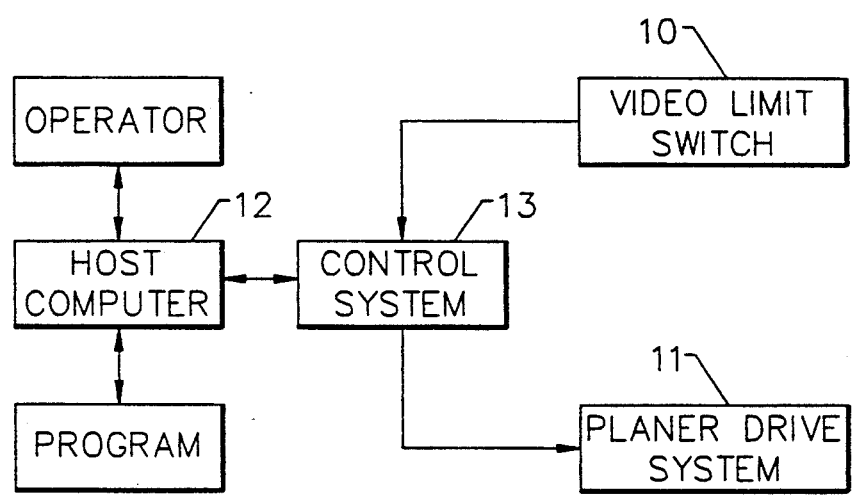
FIG. 1 is a block diagram of the planer-matcher production control system of the present invention.

The present invention is a method of optimizing the output production of a woodworking tool in a production line of the type in which individual boards are sequentially handled by different tools that typically operate at different speeds. The invention comprises selecting a target rate of board treatment by the woodworking tool, measuring the difference between the actual rate of board treatment by the woodworking tool and the selected target rate, calculating the tool speed required to reduce the difference between the target rate and the actual rate to zero, and periodically adjusting the tool speed of the woodworking tool based on the calculated speed required to reduce the difference to zero.

As stated above, in a typical woodworking mill, a planer, also referred to in this art as a "planer-unit" or a "planer-matcher" (particularly when it concurrently planes more than one surface), is often the fastest tool in the entire production line. Therefore, in preferred embodiments, an optimal use the invention is in conjunction with a planer-matcher.

Similarly, in preferred embodiments, the step of selecting a target rate of board treatment by the woodworking tool comprises selecting a target rate based upon a known constant dimension of each board, the maximum rate of production desired, and the maximum speed of the woodworking tool being used. In this regard, in typical planing situations, the invention further comprises the step of feeding boards to the planer with the boards in a longitudinal or lengthwise orientation and along a lengthwise path of travel parallel to their longitudinal orientation. Thus, in the preferred embodiment the step of selecting a target rate based on a known constant dimension of each board comprises selecting the target rate based upon a known constant length of each board. Such a step merges nicely with the typical operation of a woodworking mill in which a conveyor typically feeds boards such as the classic "2×4" to a planer-matcher.

In the preferred embodiment, the step of measuring the difference between the actual rate of board treatment by the woodworking tool and the selected target rate comprises counting the number of boards that pass a predetermined point adjacent the woodworking tool during a measured time period, and in the most preferred embodiments comprises counting the number of boards that have been treated by the planer-matcher during a measured time period. This is particularly useful when the woodworking tool is the preferred planer-matcher. First, the boards being fed to a planer-matcher are typically butted together making it more difficult to count individual pieces. The boards exit the planer separately, however, making it easier to count individual boards when they leave the planer-matcher rather than when they enter it. More fundamentally, because the invention is a control system for the particular tool, and preferably a planer-matcher, the necessary count is that of boards treated by that tool, rather than the number of boards that may be being directed or fed towards it. Thus, the most accurate count for purposes of the calculations described herein is a count of what exits the tool rather than what enters it.

In a preferred embodiment, the step of counting the boards comprises counting the boards using a video camera of a type known to those familiar with such arts which basically can conduct a line scan operation that need only count the leading edge of each board that passes in order to accurately produce such a count. It will be understood, however, that other counting devices or detectors can be just as useful in the use of the invention.

In preferred embodiments, the step of calculating the tool speed required to reduce the difference between the target rate and the actual rate to zero comprises calculating the number of boards to be treated by the woodworking tool during a given time period. In the more preferred embodiments, the step of calculating the tool speed required to reduce the difference between the target rate and the actual rate to zero comprises defining a measuring time interval and an adjusting time interval, and then counting the boards processed during the measuring time interval that includes the most recently processed boards. Thereafter, the tool speed is adjusted during the next adjusting time interval.

In the more preferred embodiments, the adjusting time interval is smaller (i.e. a shorter time period) than the measuring time interval. This results in a smoother operation than if the measuring and adjusting time intervals were identical to one another. For example, in one preferred embodiment, the measuring time interval is a period of eight minutes, and the adjusting time interval is one minute.

Further to this preferred embodiment, the measuring time interval is selected to be the integer sum of several adjusting time intervals as just described with the preferred eight-minute and one-minute intervals. In this embodiment, the step of calculating the required tool speed comprises sequentially updating the measured time interval by dropping the oldest adjusting time interval from the calculation while including the most recent adjusting time interval. Expressed with respect to the above example, the method comprises the step of calculating the average number of boards treated per minute, but calculated on the basis of the most recent eight-minute interval. Thus, on an every minute basis, the oldest minute is dropped from the eight-minute interval, the newest minute added, and the eight minute average recalculated.

In contrast to earlier systems that counted board speed or distanced travelled, in the invention the step of selecting a target rate of board treatment comprises selecting the number of boards to be treated during any given time interval, typically a one-minute time interval as just described. Furthermore, it will be understood that the step of periodically adjusting the speed of the woodworking tool can comprise either periodically increasing the speed or periodically decreasing the speed.

In another embodiment, the invention comprises the apparatus for optimizing the output production of a woodworking tool such as a planer-matcher in a production line of the type just described. In this embodiment, and as illustrated in FIG. 1, the invention comprises a counter illustrated as the video limit switch 10 for counting boards that pass the video unit during production; a planer-matcher (planer drive system) 11 or other woodworking tool operatively associated with the video unit and having a variable tool speed; a central processing unit illustrated as the host computer 12 for comparing the rate at which boards pass the video unit to a preselected target rate and for calculating the tool speed required to reduce the difference between the target rate and the actual rate to zero; and a tool speed control system 13 operatively associated with the central processing unit 12 for moderating the speed of the planer il in response to the calculations of the central processing unit 12. Typically, the central processing unit 12 will comprise a microprocessor and the tool speed control system 13 will include means for moderating the rate at which boards are planed by the planer-matcher.

In the preferred embodiments, a most useful form of carrying out the calculations is that of a P-I-D proportional-integral-derivative) algorithm. An appropriate program can be used by the central processing unit 12 and FIG. 1 schematically illustrates this relationship. An appropriate computer program written in Basic language and suitable for use on typical microprocessors is included in this specification at the end of the description, but before the claims. Additionally, a more general description of P-I-D techniques, although applied somewhat differently, is set forth in U.S. Pat. No. 5,043,682 to Takahasi et al., the contents of which are incorporated entirely herein by reference.

FIG. 1 further illustrates that an operator can set a desired target rate, or feed other useful data to the computer, but is no longer required to attempt to manually control the planer's speed.

Exemplary Program

THE FIRST PART OF THE PROGRAM SETS UP COMMUNICATION PARAMETERS FOR THE CONTROL SYSTEM AND CONFIGURES THE NECESSARY INPUTS AND OUTPUTS

```
1 MAXFILES = 3:G=1:PG=.15:IG=.05:DG=.05
4 DIM CE$(10):KILL "CTDATA.DO"
5 CLS
6 CE$(1)=">FFA":CE$(2)=">FEA":CE$(7)=">FFT01":
  CE$(4)=">FEI01":CE$(5)=">FEJ0001000":CE$(6)=">FFI04":CE$(3
  )=">FFB"
8 ON KEY GOSUB 8000,9000
20 ON COM GOSUB 1000
30 OPEN "COM:88N1D" FOR OUTPUT AS 1
40 OPEN "COM:88N1D" FOR INPUT AS 2
42 OPEN "RAM:CTDATA.DO" FOR APPEND AS 3
45 COM ON
50 FOR M=1 TO 7
55 CM$=CE$(M)
60 GOSUB 2000
65 PRINT #1,CM$
70 FOR N=1 TO 10:NEXT N:REM DELAY
72 IF INSTR(B$,"A")=0 THEN PRINT "COM FAILURE":STOP
75 NEXT M
80 REM INITIALIZE FLAG AND MINUTE TIMER
90 NM=0:F2=0
```

THIS PART OF THE PROGRAM PROMPTS THE PLANER OPERATOR FOR DIMENSIONAL DATA ON THE LUMBER TO BE RUN AND BASIC CHARACTERISTICS OF THE PLANER AND MILL MATERIAL HANDLING EQUIPMENT. THIS DATA IS USED TO DETERMINE THE INITIAL SPEED SETPOINT OF THE PLANER AND TO SET UP THE COMPUTER DISPLAY.

```
100 CLS
110 REM GET OPERATOR INPUT
130 REM PRINT "                        ";" T X W X L "
140 INPUT "BOARD SIZE           ";T
150 PRINT CHR$(27);"A";
160 PRINT "BOARD SIZE           ";:PRINT USING
"###";T;:PRINT
    " X";
170 INPUT " ";W
175 PRINT CHR$(27);"A";
180 PRINT "BOARD SIZE           ";:PRINT USING
"###";T;:PRINT
    " X";:PRINT USING "###";W;:PRINT " ";
185 INPUT " " ;L
187 PRINT CHR$(27);"A";
189 PRINT "BOARD SIZE           ";:PRINT USING
"###";T;:PRINT
    " X";:PRINT USING "###";W;:PRINT " X";:PRINT USING
    "###";L;:PRINT "       "
200 REM CALCULATE STARTUP SPEED
202 INPUT "MAX P/R (THIS SIZE)";MX
204 PRINT CHR$(27);"A";
206 PRINT "                                    ":PRINT
CHR$(27);"A";
```

```
208 INPUT "MAX PLANER SPEED      ";S
210 PRINT CHR$(27);"A";
212 SP=.95*L*MX
214 IF SP>S THEN SP=.95*S
220 PRINT "TARGET SETPOINT      ";:PRINT USING
    "#####";SP/L;:PRINT " PPM"
230 OP=SP:TT=SP/L:GOSUB 7230
300 REM GET AND DISPLAY COUNTS
302 PC=0
305 FOR N=1 TO 8:CT(N)=0:TC(N)=0:NEXT N
312 ON TIME$="00:00:20" GOSUB 5000
316 TIME$="00:00:00" F1=0
318 TIME$ ON:KEY (1) ON:KEY (2) ON
320 FOR N=1 TO 7
330 CT(N)=CT(N+1)
335 TC(N)=TC(N+1)
340 NEXT N
341 IF NM=0 THEN GOTO 343
342 CT(8)=CC:TC(8)=TT:PC=PC+CC:SCREEN 0,0
343 REM PRINT CHR$(27);"H";:FOR N=1 TO 4:PRINT
    CHR$(27);"B";:NEXT N
345 PRINT @ 121 ,"         SETPOINT (FPM)/ACTUAL (PPM)"
350 FOR N=8 TO 1 STEP -1:PRINT USING "#####";TC(N)*L;:NEXT N
360 REM PRINT "            ACTUAL"
370 FOR N=8 TO 1 STEP -1:PRINT USING "#####";CT(N);:NEXT N
380 REM PRINT CHR$(13):REM PRINT CHR$(27);"A";
390 PRINT "TARGET  ";:PRINT USING "####";NM*SP/L;:PRINT "
    PCS";:PRINT USING "####.#";NM*SP/1000;:PRINT "
    KLFT";:PRINT USING "####.#";NM*SP*W*T/12000;:PRINT "
    KBFT"
392 REM
395 PRINT "ACTUAL  ";:PRINT USING "#####";PC;:PRINT "
    PCS";:PRINT USING "####.#";PC*L/1000;:PRINT "
    KLFT";:PRINT USING "####.#";PC*L*W*T/12000;:PRINT "
    KBFT";
396 REM HOLD
400 IF F1=1 THEN GOTO 312 ELSE GOTO 396
410 STOP
```

THIS SUBROUTINE INTERCEPTS MESSAGES FROM THE CONTROL SYSTEM
AND PASSES THE INFORMATION TO ANOTHER SUBROUTINE WHICH
DECODES THE MESSAGES.

```
1000 REM RECEIVE MESSAGE FROM OPTOMUX
1005 B$=""
1010 A$=INPUT$(1,2)
1015 B$=B$+A$
1020 IF A$<>CHR$(13) THEN GOTO 1010
1025 F2=1
1030 RETURN
```

THIS SUBROUTINE CALCULATES A HEXADECIMAL CHECKSUM VALUE
WHICH IS USED IN MESSAGE TRANSACTIONS BETWEEN THE HOST
COMPUTER AND THE CONTROL SYSTEM

```
2000 REM CHECKSUM CALCULATOR
2010 SM=0
2020 FOR N=2 TO LEN(CM$)
2030 D$=MID$(CM$,N,1)
2040 SM=SM+ASC(D$)
2050 NEXT N
2060 CM=SM/256-(INT(SM/256))
2070 CM=INT(CM*256)
2080 C1=INT(CM/16)
2090 IF C1>9 GOTO 2110
2100 CM$=CM$+CHR$(C1+48)
2105 GOTO 2200
2110 CM$=CM$+CHR$(C1+55)
2200 C2=CM-(C1*16)
2210 IF C2>9 THEN GOTO 2250
2220 CM$=CM$+CHR$(C2+48)
2230 GOTO 2300
2250 CM$=CM$+CHR$(C2+55)
2300 REM PRINT CM$
2310 RETURN
```

THIS SUBROUTINE CONVERTS A DECIMAL PLANER SPEED VALUE TO A HEXADECIMAL VALUE WHICH IS SENT TO THE CONTROL SYSTEM. THIS VALUE CORRESPONDS TO A VOLTAGE WHICH THE CONTROL SYSTEM OUTPUTS TO THE PLANER DRIVE SYSTEM.

```
3000 REM CALCULATE HEX O/P VALUE
3010 OA=INT(OP/256)
3020 IF OA>9 THEN GOTO 3050
3030 CM$=CM$+CHR$(OA+48)
3040 GOTO 3100
3050 CM$=CM$+CHR$(OA+55)
3100 OB=INT((OP-(OA*256))/16)
3110 IF OB>9 THEN GOTO 3150
3130 CM$=CM$+CHR$(OB+48)
3140 GOTO 3200
3150 CM$=CM$+CHR$(OB+55)
3200 OC=INT(OP-(OA*256)-(OB*16))
3210 IF OC>9 THEN GOTO 3250
3230 CM$=CM$+CHR$(OC+48)
3240 GOTO 3400
3250 CM$=CM$+CHR$(OC+55)
3400 RETURN
```

THIS SUBROUTINE CONVERTS A HEXADECIMAL COUNTER VALUE RECEIVED FROM THE CONTROL SYSTEM INTO A DECIMAL COUNT FOR USE IN THE PLANER SPEED CONTROL PROGRAM BELOW

```
4000 REM DECODE COUNTER VALUE
5000 REM READ AND CLEAR BOARD COUNTER
5010 TIME$ STOP:KEY STOP
5020 ON COM GOSUB 1000
5025 NM=NM+1
5030 COM ON:BEEP
5040 PRINT #1, ">FFX0145"
5045 REM WAIT FOR RESPONSE FROM OPTO
```

```
5050 IF F2=0 THEN GOTO 5045
5060 F2=0
6000 REM DECODE OPTO BOARD COUNT
6010 CC=0
6020 REM A$=INPUT$(1,2)
6025 REM B$=B$+A$
6030 REM IF A$<> CHR$(13) THEN GOTO 6020
6040 FOR N=2 TO 5
6050 CC$=MID$(B$,N,1)
6060 IF ASC(CC$)>64 THEN GOTO 6100
6070 CP=ASC(CC$)-48
6080 GOTO 6150
6100 CP=ASC(CC$)-55
6150 CC=CC+(CP*(16^ABS(N-5)))
6160 NEXT N
6165 PRINT #3,USING "#####";NM,CC,OP
6170 F1=1
```

THE FOLLOWING ROUTINE CALCULATES THE DIFFERENCE, OR ERROR, BETWEEN THE COUNT VALUE WHICH THE PLANER WAS SET FOR AND THE ACTUAL COUNT OVER THE MOST RECENT EIGHT MINUTES

```
7000 REM CALCULATE NEW PLANER SPEED
7010 REM CALCULATE ERROR VECTOR
7105 IF NM<8 THEN GOTO 7280
7020 FOR N=1 TO 7
7030 E(N)=TC(N+1)-CT(N+1)
7040 NEXT N
7050 E(8)=(OP/L)-CC
```

THIS ROUTINE CALCULATES THE AVERAGE OR PROPORTIONAL ERROR

```
7060 REM CALCULATE PROPORTIONAL ERROR
7065 PE=0
7070 FOR N=1 TO 8
7080 PE=PE+E(N)
7090 NEXT N
7100 PE=PE/8
```

THIS ROUTINE CALCULATES THE DERIVATIVE OF THE ERROR WITH RESPECT TO TIME

```
7110 REM CALCULATE DERIVATIVE ERROR
7120 DE=0
7130 FOR N=1 TO 7
7140 DE=E(N+1)-E(N)
7150 NEXT N
7160 DE=DE/7
```

THE INTEGRAL, OR SUM, OF THE ERROR IS CALCULATED HERE

```
7170 REM CALCULATE INTEGRAL ERROR
7180 IE=0
7190 FOR N=1 TO 8
7200 IE=IE+E(N)
7210 NEXT N:TT=OP/L
```

THE FOLLOWING STEPS CALCULATE THE SPEED TO BE OUTPUT TO THE PLANER BASED ON THE ERROR VALUES CALCULATED ABOVE AND A SET OF GAIN FACTORS FOR EACH ERROR VALUE

```
7220 OP=SP+L*((PG*PE)-(DG*DE)+(IG*IE))
7225 IF OP>1.1*MX*L THEN OP=1.1*MX*L
7227 IF OP>S THEN OP=S
7228 IF OP<.9*MX*L THEN OP=.9*MX*L
7230 TZ=OP:OP=OP*G*(4095/S)
7235 CM$=">FEJ0001"
7240 GOSUB 3000
7245 GOSUB 2000
7250 PRINT #1,CM$
7260 REM IF INSTR(B$,"A")=0 THEN STOP
7270 OP=TZ
7280 KEY (1) ON:KEY (2) ON:RETURN
```

THIS SUBROUTINE RETURNS THE PLANER TO NORMAL MANUAL OPERATION BY SWITHCHING A RELAY IN THE CONTROL SYSTEM

```
8000 REM ENTER MANUAL MODE
8005 KEY STOP:CZ$=CM$
8010 CM$=">FFL0004"
8020 GOSUB 2000
8030 PRINT #1,CM$
8035 REM WAIT FOR OPTO RESPONSE
8040 IF F2=0 THEN GOTO 8035
8050 IF INSTR(B$,"A") =0 THEN STOP
8055 F2=0
8057 KEY (1) ON:KEY (2) ON
8060 CM$-CZ$:RETURN
```

THIS SUBROUTINE CAUSES THE SPEED OUTPUT SIGNAL FROM THE COMPUTER PROGRAM TO BE SENT TO THE PLANER BY SWITCHING A RELAY IN THE CONTROL SYSTEM

```
9000 REM ENTER AUTOMATIC MODE
9005 KEY STOP:CZ$=CM$
9010 CM$=">FFK0004"
9020 GOSUB 2000
9030 PRINT #1,CM$
9035 REM WAIT FOR OPTO RESPONSE
9040 IF F2=0 GOTO 9035
9050 IF INSTR(B$, "A")=0 THEN STOP
9055 F2=0
9057 KEY (1) ON:KEY (2) ON
9060 CM$=CZ$:RETURN
```

THIS ROUTINE AUTOMATICALLY SWITCHES THE PLANER TO MANUAL MODE IF AN ERROR IS DETECTED IN THE CONTROL PROGRAM

```
10000 REM DISABLE SPEED O/P ON ERROR
10010 CM$=">FFL0004"
10015 GOSUB 2000
10020 PRINT #1,CM$
10030 REM HOLD FOR RESPONSE
```

```
10040 REM IF F2=0 THEN GOTO 10030
10050 REM IF INSTR(B$,"A") =0 THEN GOTO 10000
10060 STOP
```

In the drawings and specification, there have been disclosed typical disclosed embodiments of the invention, and, although specific terms have been employed, they have been used in a generic and descriptive sense only and not for purposes of limitation, the scope of the invention being set forth in the following claims.

That which is claimed is:

1. A method of optimizing the output production of a woodworking tool in a production lien of the type in which individual boards are sequentially handled by different tools that typically operate at different speeds, the method comprising:
   selecting a target rate of board treatment by the woodworking tool;
   measuring the difference between the actual rate of board treatment by the woodworking tool and the selected target rate;
   calculating the tool speed required to reduce the difference between the target rate nd the actual rate to zero; and
   periodically adjusting the tool speed of the woodworking tool based on the calculated speed required to reduce the difference to zero.

2. A method according to claim 1 wherein the woodworking tool is a planer matcher.

3. A method according to claim 1 wherein the step of calculating the tool speed required to reduce the difference between the target rate and the actual rate to zero comprises calculating the number of boards to be treated by the woodworking tool during a given time period.

4. A method according to claim 1 wherein the step of measuring the difference between the actual rae of board treatment by the woodworking tool and the selected target rate comprises counting the number of boards that pass a predetermined point adjacent the woodworking tool during a measured time period.

5. A method according to claim 1 wherein the step of measuring the difference between the actual rate of board treatment by the woodworking tool and the selected target rate comprises counting the number of boards have been treated by the woodworking tool during a measured time period.

6. A method according to claim 4 wherein the step of counting the boards comprises counting the boards using a video scanning camera.

7. A method according to claim 1 wherein the step of selecting a target rate of board treatment by the woodworking tool comprises selecting a target rate based upon a known constant dimension of each board, the maximum rate of production desired, and the maximum speed of the woodworking tool being used.

8. A method according to claim 7 further comprising the step of feeding boards to the woodworking tool with the boards in a longitudinal orientation and a long a path of travel parallel to their longitudinal orientation, and wherein the type of selecting a target rate based on a known constant dimension of each board comprises selecting the target rate based on a known constant length of each board.

9. A method according to claim 1 wherein the step of calculating the tool speed required to reduce the difference between the target rate and the actual rate to zero comprises:
   defining a measuring time interval and an adjusting time interval;
   counting the boards processed during the measuring time interval that includes the most recently processed boards; and
   thereafter adjusting the tool speed during the next adjusting time interval.

10. A method according to claim 9 wherein the adjusting time interval is a smaller interval than the measuring time interval.

11. A method according to claim 10 wherein the measuring time interval is the integer sum of several adjusting time intervals, and wherein the step of calculating the required tool speed comprises sequentially updating the measured time interval by dropping the oldest adjusting time interval from the calculating while including the most recent adjusting time interval.

12. A method according to claim 9 further comprising the step of calculating the average number of boards treated per adjusting time interval during the measuring time interval.

13. A method according to claim 1 wherein the step of selecting a target rate of board treatment comprises selecting the number of boards to be treated during any given time interval.

14. A method of optimizing the output production of a planer-matcher in a production line of the type in which individual boards are sequentially handled by the planer matcher and by different tools that typically operate at different speeds, the method comprising:
   measuring the difference between the actual rate of board treatment by the planer-matcher and a selected target rate of board treatment; and
   periodically adjusting the tool speed of the planer-matcher based on the a calculated tool speed required to reduce the difference between the target rate and the actual rate to zero.

15. A method according to claim 14 wherein the step of measuring the difference between the actual rate of board treatment by the planer-matcher and a selected target rate of board treatment comprises selecting the target rate of board treatment by the planer-matcher and thereafter measuring the difference between the actual rate of board treatment by the planer-matcher and the selected target rate.

16. A method according to claim 14 further comprising the step of calculating the tool speed required to reduce the difference between the target rate and the actual rate to zero prior to the step of periodically adjusting the tool speed of the planer-matcher.

17. A method according to claim 16 wherein the step of calculating the tool speed required to reduce the difference between the target rate and the actual rate to zero comprises:
   counting the boards processed during an eight minute time interval that includes the most recently processed boards; and
   thereafter adjusting the tool speed during the next one minute time interval.

18. A method according to claim 17 wherein the stp of calculating the tool speed comprises sequentially updating the eight minute measured time interval by dropping the oldest minute from the calculation while including the most recent minute.

19. An apparatus for optimizing the output production of a woodworking tool in a production line of the type in which individual boards are sequentially handled by different tools that typically operate at different speeds, said apparatus comprising:
- a counter for counting boards that pass said counter during production;
- a woodworking tool operatively associated with said counter and having variable tool speed;
- a central processing unit for comparing the rate at which boards pass said counter to a preselected target rate, and for calculating the tool speed required to reduce the difference between the target rate and the actual rate to zero; and
- a tool speed control system operatively associated with said central processing unit for moderating the speed of said woodworking tool in response to the calculations of said central processing unit.

20. An apparatus according to claim 19 wherein:
- said counter comprises a video camera;
- said woodworking tool comprises a planer-matcher;
- said central processing unit comprises a microprocessor; and
- said tool speed control system comprises means for moderating the rate at which boards are planed by said planer-matcher.

* * * * *

UNITED STATES PATENT AND TRADEMARK OFFICE
CERTIFICATE OF CORRECTION

PATENT NO. : 5,251,681

DATED : October 12, 1993

INVENTOR(S) : Davenport

It is certified that error appears in the above-identified patent and that said Letters Patent is hereby corrected as shown below:

Column 1, line 27, after "line" insert a period.

Column 1, line 65, "OBJECTION" should be -- OBJECT --

Column 2, line 4, omit "in which" (one occurrence)

Column 2, line 53, after "use" insert -- of --

Column 4, line 13, "distanced" should be -- distance --

Column 4, line 39, "il" should be -- 11 --

Column 4, line 47, insert parenthesis before "propor-"

Column 4, line 57, "5,043,682" should be -- 5,043,862 --

Column 15, line 7, "disclosed" (second occurrence) should be -- preferred --

IN THE CLAIMS:

Column 15, line 14, "lien" should be -- line --

Column 15, line 24, "nd" should be -- and --

Column 15, line 30, "planer matcher" should be -- planer-matcher --

Column 15, line 38, "rae" should be -- rate --

UNITED STATES PATENT AND TRADEMARK OFFICE
CERTIFICATE OF CORRECTION

PATENT NO. : 5,251,681
DATED : October 12, 1993
INVENTOR(S) : Davenport

It is certified that error appears in the above-identified patent and that said Letters Patent is hereby corrected as shown below:

```
Column 15, line 47, after "boards" insert -- that --

Column 15, line 60, "a long" should be -- along --

Column 15, line 62, "type" should be -- step --

Column 16, line 21, "calculating" should be
      -- calculation --

Column 16, line 34, "planer matcher" should be
      -- planer-matcher --

Column 16, line 40, omit "a"

Column 16, line 65, "stp" should be -- step --
```

Signed and Sealed this

Twelfth Day of April, 1994

*Attest:*

BRUCE LEHMAN

*Attesting Officer*   Commissioner of Patents and Trademarks